Feb. 2, 1926. 1,571,761
A. J. DILLEY
SELF LUBRICATING SPRING HANGER, BOLT, AND EYE
Filed May 7, 1921
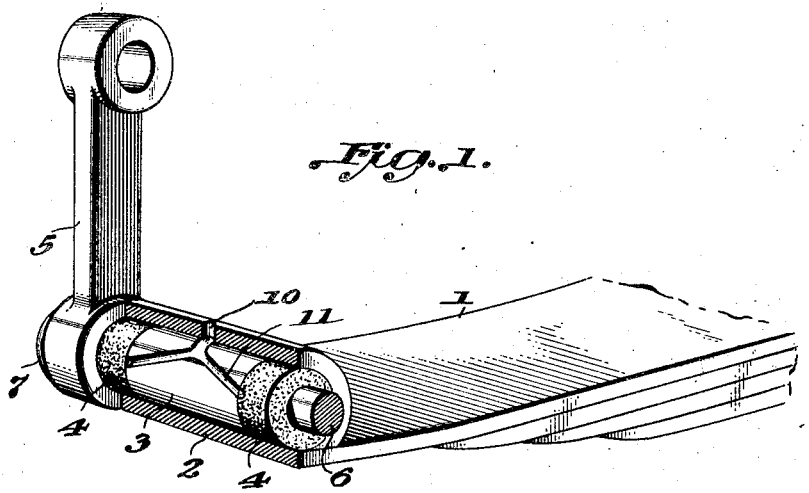
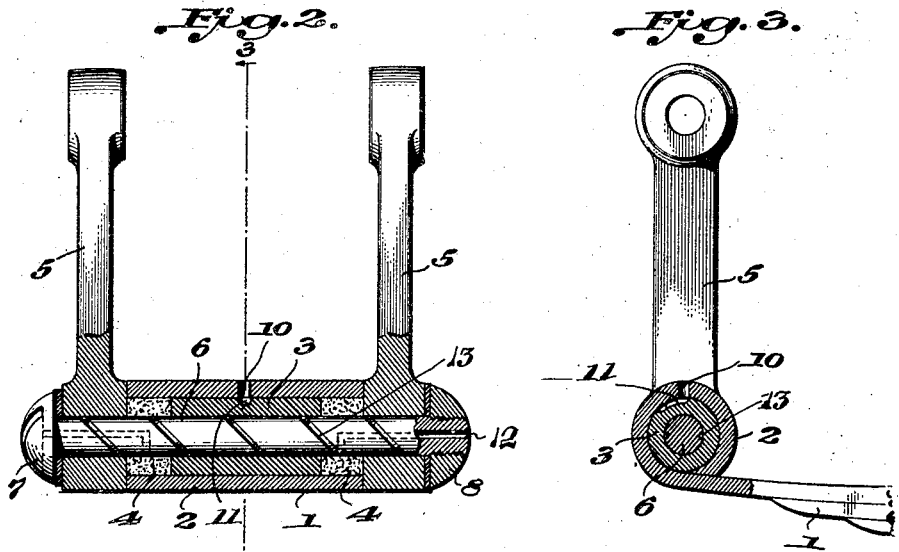
Inventor Patented Feb. 2, 1926.

1,571,761

UNITED STATES PATENT OFFICE.

ARZENO J. DILLEY, OF RIVER FOREST, MICHIGAN.

SELF-LUBRICATING SPRING HANGER, BOLT, AND EYE.

Application filed May 7, 1921. Serial No. 467,704.

*To all whom it may concern:*

Be it known that I, ARZENO J. DILLEY, residing at River Forest, Michigan, a citizen of the United States, have invented certain new and useful Improvements in Self-Lubricating Spring Hangers, Bolts, and Eyes, of which the following is a specification.

My invention relates to an improvement in a self-lubricating spring hanger, bolt and eye, and it comprises the eye of a spring, with a bushing and washers or mats at the ends thereof of absorbent material, hangers, and a bolt for holding the parts together.

In the accompanying drawings:—

Fig. 1 is a view in perspective of the end of a spring holding the eye having the bushing therein, and showing one of the absorbent mats or washers;

Fig. 2 is a view of the bushing;

Fig. 3 shows the spring-bolt and hanger partly assembled;

Fig. 4 is a side view of one of the hangers; and

Fig. 5 is an inside view of the nut.

The numerals 1, 1, represent the usual leaves for forming the spring; and 2 is the usual eye formed by coiling the end of the spring into cylindrical form, one being provided, of course, at each end of the spring.

Within this eye a metal bushing 3 is fitted. This is made of bronze, or other material, and preferably a trifle less in length than the length of the eye. In the space in the eye at the ends of the bushing, the absorbent mats or washers 4 of felt or other material are inserted. Oil ducts 12 (as shown in full and in dotted lines in Fig. 2) are preferably formed in the ends of the bolt 6, and may be used as a means for conducting lubricant to the absorbent mats or washers 4, if desired.

These washered ends of the eye are embraced by the two hangers 5, 5; and spring bolt 6, having a semi-spherical head 7 and held by a semi-spherical nut 8, is inserted through the orifices 9 in the hangers, the washers, and the bore of the bushing; and the nut 8, which may be a lock-nut, is screwed on the end of the bolt. The bolt 6 itself may be ground to facilitate the distribution of the oil, for example as indicated by the groove 13 extending spirally around its surface as viewed in Fig. 2. The head of the bolt may be of various shapes, as may the form of the nut, although the semi-spherical form is preferred. A lubricant hole 10 is provided on the upper surface of the eye to receive the oil. The surface of the metal bushing 3 is provided with grooves 11 to receive and distribute the lubricant from the hole 10 formed in the spring-eye.

In this way, it is possible to entirely do away with the usual oil or grease-cups, and thus effect a very material saving in the cost of construction and the maintenance of a car; and with this construction, I have found by actual demonstration that each eye will hold enough oil to lubricate the spring bolt, eye and hanger in a travel of at least five thousand miles without re-oiling.

The absorbent washers not only lubricate the hangers and the end of the eye, but also hold a large portion of the oil within the bushing and eye and in contact with the body of the bolt, and at the same time keep out dust and grit. Altogether the parts thus formed and assembled provide an effectual lubricating joint, and one which is simple, inexpensive, and easy to keep in order and lubricated.

I claim:

1. A self-lubricating spring hanger, bolt and eye including a leaf-spring having an eye formed at one end thereof, means of support for said eye, a bolt extending through the eye for fastening said means thereto, a bushing through which the bolt extends and having an external groove for receiving and distributing lubricant, and the eye having a hole for lubricant leading to the external groove in the bushing.

2. A self-lubricating spring-hanger, bolt and eye including a leaf-spring having an eye formed at the ends, hangers embracing the ends of the eye, a spring-bolt externally grooved and having oil ducts extending in from the ends, a bushing through which the bolt extends and of less length than the eye while fitting the space between the bolt and eye, said bushing having an external groove for receiving and distributing lubricant, the eye having a hole for lubricant leading to the external groove in the bushing, and absorbent material occupying the spaces between the ends of the bushing and the hanger adapted to facilitate the distribution of lubricant and also exclude extraneous material.

3. A self-lubricating spring hanger, bolt and eye including a leaf-spring having an eye formed at one end thereof, means of support for said eye, a bolt extending through the eye for fastening said means thereto, a bushing through which the bolt extends, and of less length than the eye located in the center of the latter, an absorbent medium filling the spaces between the ends of the bushing and the ends of the eye for lubricating the parts, the bushing having grooves leading to the ends thereof for distributing lubricant to the absorbent medium, and the eye having a hole for lubricant leading to the external grooves in the bushing.

In testimony whereof I hereunto affix my signature.

ARZENO J. DILLEY.